United States Patent
Toraichi et al.

(10) Patent No.: US 6,748,409 B1
(45) Date of Patent: Jun. 8, 2004

(54) DATA INTERPOLATING SYSTEM

(75) Inventors: Kazuo Toraichi, Sayama (JP); Kouichi Wada, Tsukuba (JP)

(73) Assignee: Niigata Seimitsu Co., Ltd., Niigata (JP)

( * ) Notice: Subject to any disclaimer, the term of this patent is extended or adjusted under 35 U.S.C. 154(b) by 0 days.

(21) Appl. No.: 09/601,007

(22) PCT Filed: Jan. 25, 1999

(86) PCT No.: PCT/JP99/00265
§ 371 (c)(1),
(2), (4) Date: Sep. 8, 2000

(87) PCT Pub. No.: WO99/38090
PCT Pub. Date: Jul. 29, 1999

(30) Foreign Application Priority Data

Jan. 26, 1998 (JP) .......................................... 10-027769

(51) Int. Cl.[7] .............................................. G06F 17/17
(52) U.S. Cl. ...................................................... 708/313
(58) Field of Search ........................................ 708/313

(56) References Cited

PUBLICATIONS

Masaru Kamada et al, "Quadratic spline interpolator", International Journal of Systems Science, vol. 27, No. 10 (1996), pp. 977–983.

Masaru Kamada et al, "A Smooth Signal Generator Based on Quadratic B–spline Functions", IEEE Transactions on Signal Processing, vol. 43, No. 5 (1995), pp. 1252–1255.

Masaru Kamada et al, "A Quadratic Spline Generator Based on B–spline Functions", PROC. ICASSP 89, vol. 2 (1989), pp. 1243–1246.

*Primary Examiner*—Tan V. Mai
(74) *Attorney, Agent, or Firm*—Dellett & Walters

(57) ABSTRACT

A data interpolating system by which the operating quantity can be decreased and no truncation error is produced. A data processor comprises a discrete value extracting section 10, a sampling function operating section 20, and a convolution operating section 30 so as to perform interpolation between discrete values. The discrete value extracting section 10 extracts just previous four value from successively inputted discrete data, and the sampling function operating section 20 calculates, when the data interpolating position is specified, the value of the interpolating position based on the distances between the data interpolating position and the discrete values by using a sampling function of local support which can be differentiated only once over the whole region. The convolution operating section 30 multiplies the values of the four sampling functions by the discrete values, and adds up the products, thus performing convolution operation and outputting the interpolation value.

8 Claims, 4 Drawing Sheets

DATA INTERPOLATING SYSTEM

BACKGROUND OF THE INVENTION

1. Field of the Invention

The present invention relates to a data interpolating system interpolation a value between discrete data such as sounds and images. In this specification, it is assumed that a case where function values have finite values except zero in a local region and becomes zero in regions different from the region is called a "local support."

2. Description of the Prior Art

Conventionally, a method of performing data interpolation by using a sampling function is known as a data interpolation for obtaining a value between sample values that are given beforehand.

FIG. 5 is an explanatory diagram of a sampling function called a sinc function conventionally known. This sinc function is obtained when a Dirac delta function is inverse-Fourier-transformed, and becomes one only at a sample point, where t=0, and zero at all other sample points.

FIG. 6 is an explanatory diagram of data interpolation by using the sampling function shown in FIG. 5.

By the way, in case where a conventional data interpolation system by using the sinc function as a sampling function, it is theoretically possible to obtain an accurate interpolation value by adding values of respective sampling functions, corresponding to sample points from $-\infty$ to $+\infty$, with convolution. Nevertheless, when the above-described interpolation operation is actually attempted with one of various types of processors, a truncation error arises due to the truncation of processing within a finite interval. Therefore, this system has a problem that sufficient accuracy cannot be obtained if the interpolation operation is performed with a small number of sample values. For example, so as to obtain 96 dB of dynamic range of S/N ratio in a sample signal, 1024 sample points should be considered, and hence, in case of using sample points less than the quantity, it is not possible to obtain sufficient sound quality. Furthermore, it is similar in consideration of image data, it is not possible to obtain sufficient image quality in case of performing interpolation processing with a small number of sample points, and the operation quantity becomes huge in case of increasing sample points, which become objects of calculation, on the contrary. Therefore, this is not practical.

SUMMARY OF THE INVENTION

The present invention is created in consideration of these points, and an object of the present invention is to provide a data interpolation system that can reduce operation quantity and has a small error.

A data interpolation system of the present invention performs interpolation operation between plural of discrete data by using a sampling function that can be differentiated and has values of a local support. Therefore, since it is good enough only to make discrete data, included in this local support interval, be objects of the interpolation operation, the operation quantity is few, and it is possible to obtain good interpolation accuracy because of no truncation error arising.

In particular, it is preferable to use a function of the local support, which can be differentiated only once over the whole range, as the sampling function described above. It is considered that it is necessary that various signals existing in the natural world have differentiability because the signals change smoothly. Nevertheless, it is considered that it is not necessary that the differentiability is not always infinite, and that it is possible to sufficiently approximate natural phenomena so long as the signals can be differentiated only once.

In this manner, although there are many advantages by using a sampling function of the local support that can be differentiated finite times, conventionally, it was considered that a sampling function fulfilling these conditions did not exist. Nevertheless, by the present inventor's research, a function fulfilling the conditions described above is found.

Concretely, letting a third order B spline function be F(t), a sampling function H(t) to which the present invention is applied can be obtained by equation, $-F(t+\frac{1}{2})/4+F(t)-F(t-\frac{1}{2})/4$. This sampling function H(t) is a function of a local support that can be differentiated only once in the whole region and whose value converges to zero at $t=\pm 2$, and fulfills two conditions described above. By performing the interpolation between discrete data by using such a function H(t), it is possible to perform the interpolation operation whose operation quantity is few and whose accuracy is high. Therefore, in case of using, discrete data that are obtained by sampling sounds or images for example, it becomes possible to perform real-time processing whose accuracy is high.

In addition, the three order B spline function F(t) can be expressed as $(4t^2+12t+9)/4$ in $-\frac{3}{2} \leq t < -\frac{1}{2}$, $-2t^2+\frac{3}{2}$ in $-\frac{1}{2} \leq t < \frac{1}{2}$, and $(4t^2-12t+9)/4$ in $\frac{1}{2} \leq t \leq \frac{3}{2}$. Therefore, it is possible to perform calculation of the sampling function, described above, by such a piecewise polynomial expressed in quadric functions. Hence, it is possible to reduce the operation quantity due to comparatively simple operation contents.

In addition, it is possible to express the sampling function in quadric piecewise polynominals without expressing the sampling function by using the B spline function as described above. Concretely, it is possible to perform the above-described interpolation processing by using a sampling function defined in $(-t^2-4t-4)/4$ in $-2 \leq t < -\frac{3}{2}$, $(3t^2+8t+5)/4$ in $-\frac{3}{2} \leq t < -1$, $(5t^2+12t+7)/4$ in $-1 \leq t < -\frac{1}{2}$, $(-7t^2+4)/4$ in $-\frac{1}{2} \leq t < \frac{1}{2}$, $(5t^2-12t+7)/4$ in $\frac{1}{2} \leq t < 1$, $(3t^2-8t+5)/4$ in $1 \leq t < \frac{3}{2}$, and $(-t^2+4t-4)/4$ in $\frac{3}{2} \leq t \leq 2$.

In addition, the data interpolation system of the present invention includes discrete data extracting unit, sampling function operating unit, and convolution operating unit so as to perform the above-described interpolation operation. The discrete data extracting unit extracts a plurality of discrete data, which exists so as to sandwich a data interpolating position, and which is an object of interpolation operation. The sampling function operating unit calculates a value of the sampling function H(t) for each of a plurality of discrete data extracted in this manner, letting distance between the data interpolating position and discrete data be t. Furthermore, the convolution operating unit performs convolution operation to a plurality of values of the sampling function that is obtained by the calculation. In this manner, just by calculating values of the sampling function corresponding to a plurality of discrete data extracted and performed the convolution operation to this result, it is possible to perform data interpolation between discrete values and to drastically reduce processing volume necessary for interpolation processing. Furthermore, since no truncation error arises by using a sampling function of a local support as described above, it is possible to increase processing accuracy.

DETAILED DESCRIPTION OF THE PREFERRED EMBODIMENTS

A data processor of an embodiment to which a data interpolation system of the present invention is applied is characterized in that the data processor performs interpolation processing between respective inputted discrete data by using a sampling function that can be differentiated finite times and has values of a local support. Hereinafter, a data processor according to an embodiment will be described in detail in reference to drawings.

Figure 1:
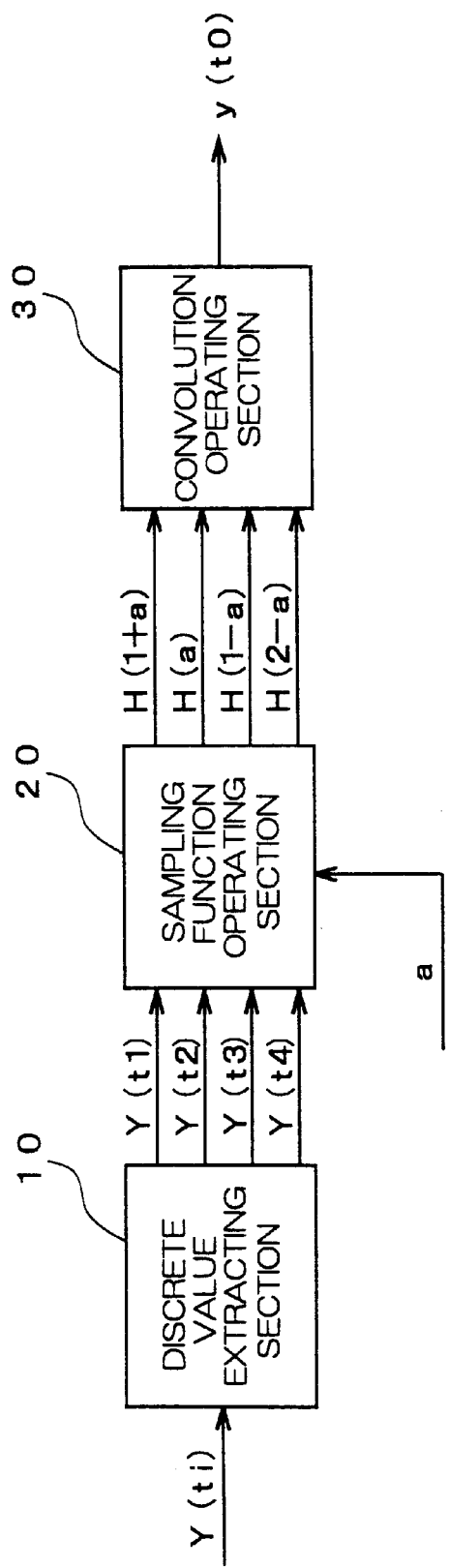
FIG. 1 is a block diagram showing the configuration of a data processor of this embodiment.

FIG. 1 is a block diagram showing the configuration of a data processor of this embodiment. The data processor shown in FIG. 1 performs interpolation processing values between the discrete data on the basis of discrete data inputted, and includes a discrete value extracting section 10, a sampling function operating section 20, and a convolution operating section 30.

The discrete value extracting section 10 as the discrete data extracting unit extracts four data immediately before out of discrete data sequentially inputted and holds the four data until next new data are inputted. The four discrete data is outputted to the sampling function operating section 20 connected as the next stage.

The sampling function operating section 20 calculates values of the sampling function on the basis of the distance between interpolating position a and the respective discrete data where the interpolating position is designated. Each value of the sampling function is calculated for each of 4 discrete data outputted from the discrete value extracting section 10.

The convolution operating section 30 performs convolution operation corresponding to 4 points of discrete data by multiplying each of 4 values of the sampling function, which are calculated by the sampling function operating section 20, by each value of discrete data and adding the products. A value obtained by this convolution operation becomes an interpolation value at a predetermined interpolation position between the second discrete data and the third discrete data.

Figure 2:
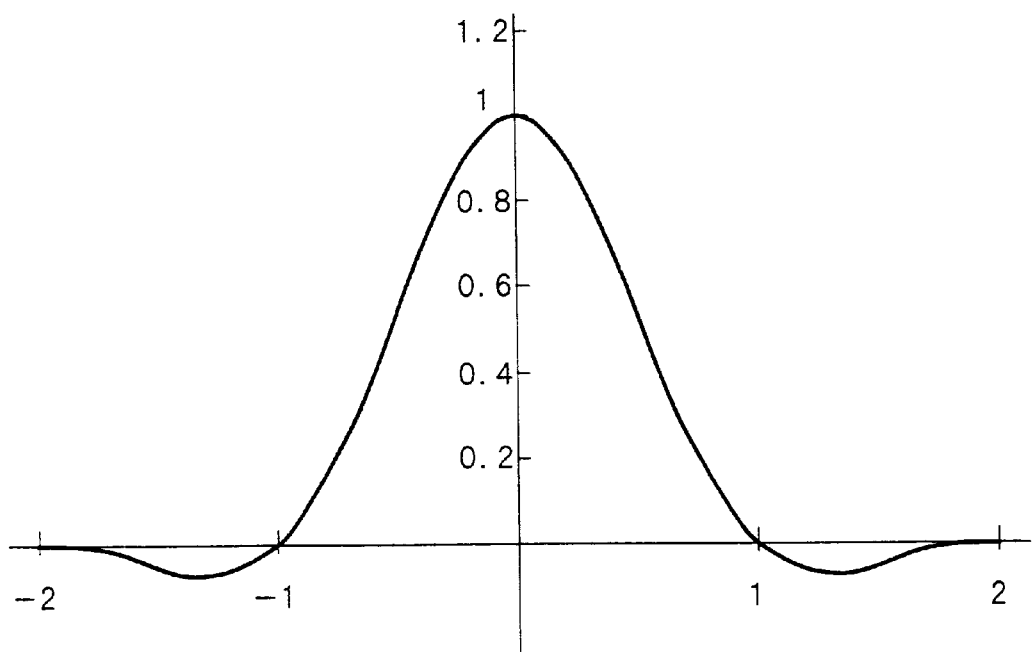
FIG. 2 is an explanatory graph of a sampling function used in operation in a sampling function operating section.

Next, data interpolation processing performed by the data processor described above will be described in detail. FIG. 2 is an explanatory graph of a sampling function used in operation in the sampling function operating section 20. A sampling function H(t) shown in FIG. 2 is a function of a local support to which attention is paid on differentiability. For example, the function H(t) can be differentiated only once in the whole region and a function of a local support having finite values, which are not zeroes, when a sample position along a horizontal axis is between −2 and +2. In addition, since being a sampling function, the function H(t) is characterized in that the function H(t) becomes one only at a sample point with t=0 and becomes zero at sample points with t=±1 and ±2.

It is verified by the present inventor's investigation that a function H(t) fulfilling various conditions described above (a sampling function, one-time differentiability, and a local support) exists. Concretely, with letting a third order B spline function be F(t), such a sampling function H(t) can be defined as:

$$H(t) = -F(t+\tfrac{1}{2})/4 + F(t) - F(t-\tfrac{1}{2})/4.$$

Here, the third order B spline function F(t) is expressed as:

$(4t^2+12t+9)/4;\ -\tfrac{3}{2} \leq t < -\tfrac{1}{2}$ $-2t^2+\tfrac{3}{2};\ -\tfrac{1}{2} \leq t < \tfrac{1}{2}$ $(4t^2-12t+9)/4;\ \tfrac{1}{2} \leq t < \tfrac{3}{2}$ The above-described sampling function H(t) is a quadric piecewise polynomial, and uses the third order B spline function F(t). Therefore, the function H(t) is a function of a local support that is guaranteed to be differentiable to only once over the whole region. In addition, the function H(t) becomes zero at t=±1 and ±2.

In this manner, the above-described function H(t) is a sampling function and a function of a local support that can be differentiated only once over the whole region and converges to zero at t=±2. Therefore, it is possible to perform interpolation of a value between discrete data using a function, which is differentiable only once, by performing convolution on the basis of respective discrete data using this sampling function H(t).

Figure 3:
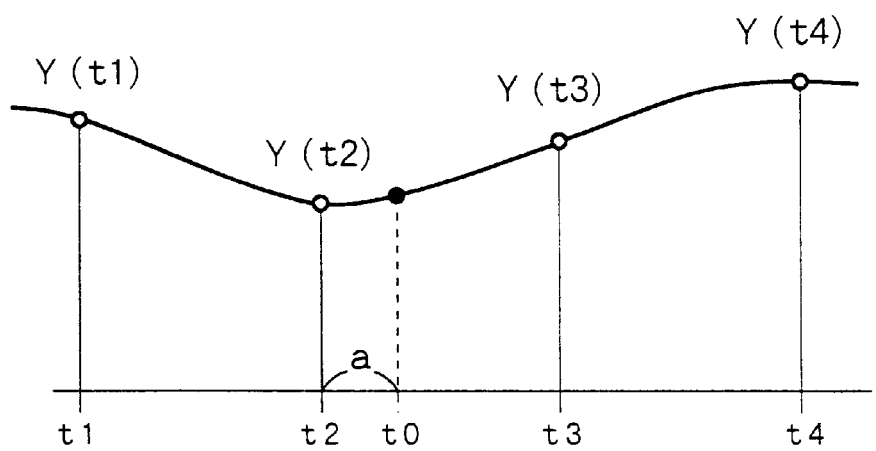
FIG. 3 is a graph showing the relationship between the discrete data and an interpolation data between the data.

FIG. 3 is a graph showing the relationship between the discrete data and interpolation data between the discrete data. Generally, discrete data as sample data can be obtained by sampling a signal, which smoothly changes, at constant intervals (including a case where time intervals are constant and a case where spatial intervals are constant) and quantizing the sample data. Generally, in each of various types of data processors such as computers, discrete data obtained in this manner is given as an object of processing.

When the discrete data is given, a value between that discrete data becomes necessary in many cases. For example, the cases are a case of reproducing an analog sound from sample data of sounds, a case of enlarging an image, and the like. For example, in FIG. 3, by letting respective discrete data at sample positions t1, t2, t3, and t4, which are located at equal intervals, be Y(t1), Y(t2), Y(t3), and Y(t4), it is assumed to obtain an interpolation value y corresponding to a predetermined position t0 (distance "a" from the sample position t2) between the sample positions t1 and t2.

Generally, so as to obtain the interpolation value y by using a sampling function, it is possible to obtain the interpolation value y by obtaining a value of the sampling function at the position of the interpolation value y for respective discrete data given and performing convolution operation using these values. In order to obtain the interpolation value y accurately, since the sinc function converges to zero at sample points t=±∞, it is necessary to calculate a value of the sinc function at a position of the interpolation value y according to each discrete data between t=±∞ and performing convolution operation using these values.

Nevertheless, since the sampling function H(t) used in this embodiment converges to zero at sample points with t=±2, it is sufficient to consider discrete data between t=±2. Therefore, since it is sufficient to consider only four discrete data Y(t1), Y(t2), Y(t3), and Y(t4) that correspond to t=t1, t2, t3, and t4 so as to obtain the interpolation value y shown in FIG. 3, it is possible to drastically reduce operation quantity. In addition, since it is theoretically unnecessary to consider discrete data with t=±3 or outer regions without disregarding the discrete data in consideration of operation quantity, accuracy, and the like although the discrete data should be considered, no truncation error arises.

FIGS. 4A to 4D are detailed explanatory graphs of interpolation processing operation by the sampling function operating section 20 and convolution operating section 30. As shown in FIGS. 4A to 4D, the procedure of the interpolation processing includes the steps of making peak height of the sampling function H(t) at t=0 (a center position), which is shown in FIG. 2, coincide every sample point with each other, and obtaining a value of the sampling H(t) at each interpolation position t0 at this time.

Figure 4A:
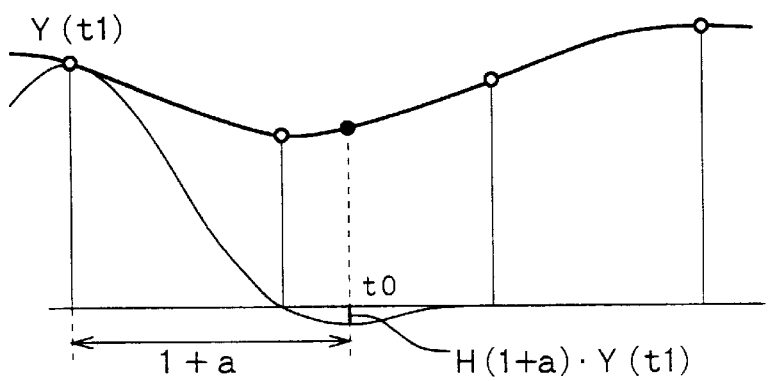
FIGS. 4A to 4D include detailed explanatory graphs of interpolation processing operation by the sampling function operating section and a convolution operating section.

For example, the discrete data Y(t1) at the position t1 shown in FIG. 4A will be concretely described. The distance between the interpolation position t0 and sample position t1 becomes 1+a, with letting the distance between respective sample positions be normalized into 1. Therefore, a value of the sampling function at the interpolation position t0 at the time of the center position of the sampling function H(t) being aligned to the sample position t1 becomes H(1+a). Actually, since the peak height of the center position of the sampling function H(t) is adjusted so that the peak height may coincide with the discrete data Y(t1, a value to be obtained becomes a value H(1+a)(t1) obtained by multiplying the above-described function value H(1+a) by Y(t1). In the configuration shown in FIG. 1, H(1+a) is calculated by the sampling function operating section 20, and operation or multiplying this by Y(t1) is performed by the convolution operating section 30.

Figure 4B:
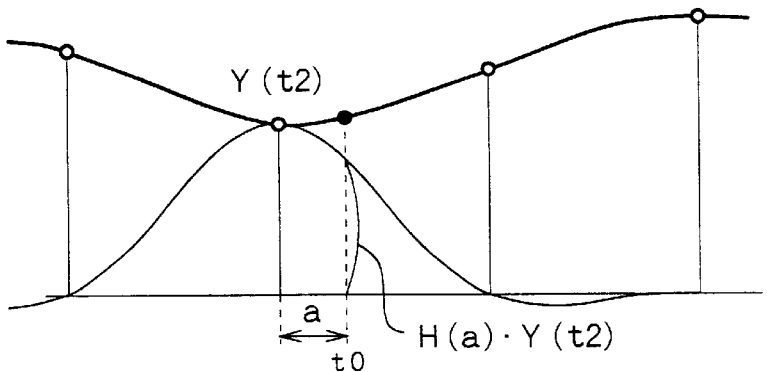
Figure 4C:
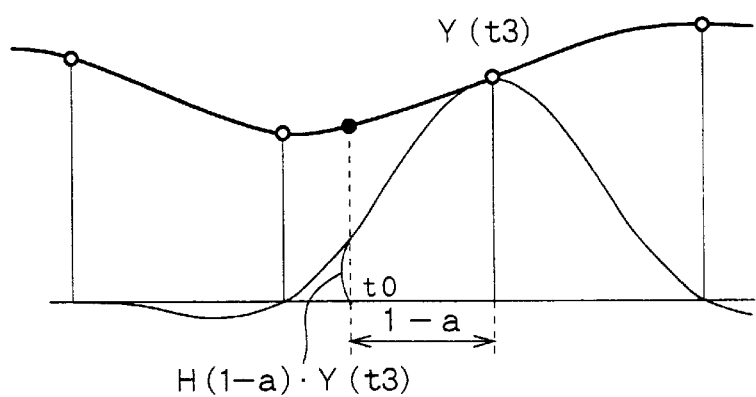
Figure 4D:
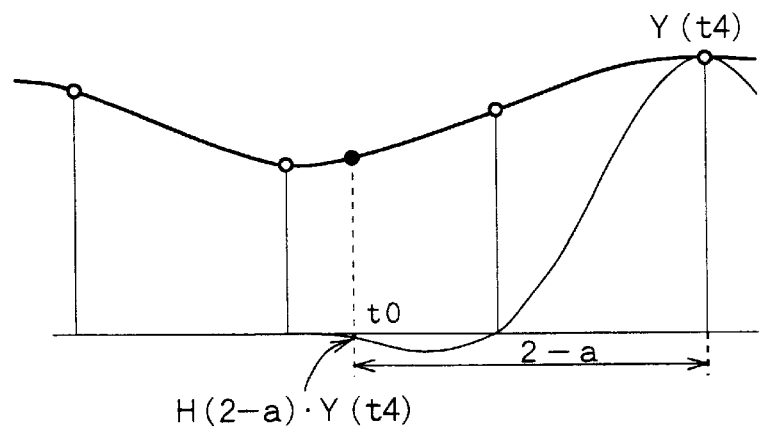
Figure 5:
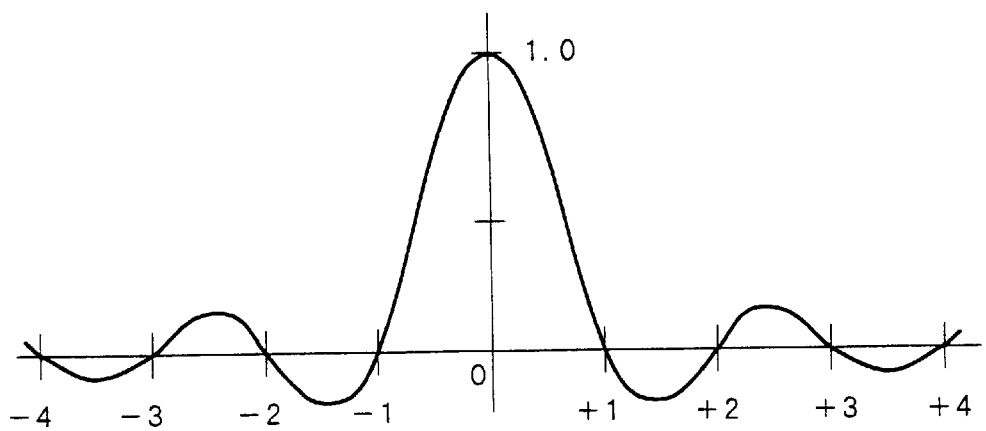
FIG. 5 is an explanatory graph of a sinc function.
Figure 6:
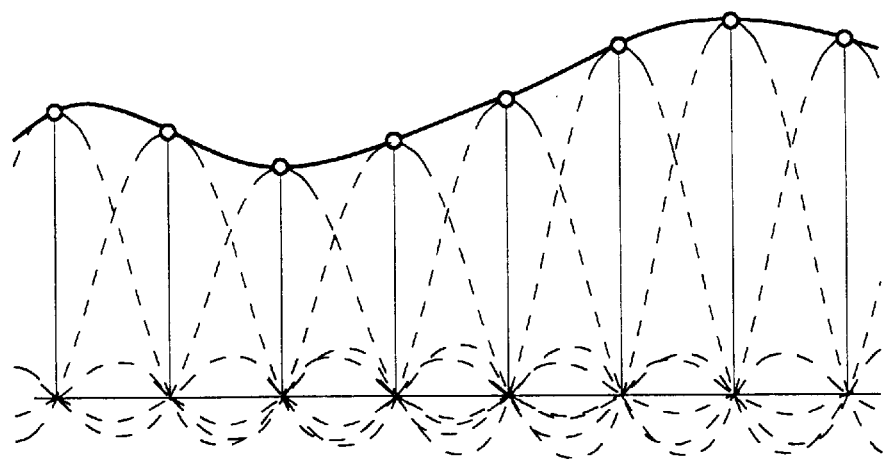
FIG. 6 is an explanatory graph of data interpolation using the since function.

Similarly, as shown in FIGS. 4B to 4D, respective operation results at interpolation position t0, H(a)·Y(t2), H(1−a)·Y(t3), and H(2−a)·Y(t4) are obtained according to three other discrete data.

The convolution operating section 30 performs convolution operation by adding four operation results, H(1+a)·Y(t1), H(a)·Y(t2), H(1−a)·Y(t3), and H(2−a)·Y(t4) that are obtained in this manner, and outputs the interpolation value y(t0).

Like this, the data processor of this embodiment uses a function of a local support that can be differentiated only once over the whole region as a sampling function. Therefore, it is possible to drastically reduce operation quantity necessary for interpolation processing between discrete data. Owing to this, it becomes possible in sound interpolation processing to easily perform real-time processing, and in image interpolation processing to lighten the load of the processing apparatus and shorten processing time in case of handling huge processing data.

In particular, it is possible not only to reduce operation quantity because it is sufficient to consider only 4 discrete data as processing objects, but also to obtain value of a sampling function by simple arithmetic of sum of products because the sampling function is expressed in a simple quadric piecewise polynomial. Therefore, also from this point, it is possible to further reduce the operation quantity.

In addition, since the sampling function used in this embodiment is a local support, there is no truncation error conventionally arising when discrete data that is a processing object is reduced to a finite number. Therefore, it is possible to prevent an aliasing distortion from arising.

Furthermore, the present invention is not limited to the above-described embodiment, but it is apparent that working modes different in a wide range can be formed without departing from the spirit and scope of the present invention. For example, although the sampling function is defined as a function of a local support, which can be differentiated only once over the whole region, in the above-described embodiment, the number of times of differentiability can be set to be two or more. In addition, as shown in FIG. 2, although the sampling function in this embodiment converges into zero at t=±2, the sampling function can be made to converge into zero at t=±3 or outer values. For example, if the sampling function converges into zero at t=±3, the discrete value extracting section 10 extracts six latest data out of discrete data inputted in order, and the sampling function operating section 20 calculates a value of the sampling function for the six discrete data.

In addition, although, in the above-described embodiment, the sampling function H(t) is defined by using the B spline function F(t), it is possible to equivalently express the sampling function H(t) by using a quadric piecewise polynomial as follows:

$(-t^2-4t-4)/4; \ -2 \leq t < -3/2$
$(3t^2+8t+5)/4; \ -3/2 \leq t < -1$
$(5t^2+12t+7)/4; \ -1 \leq t < -1/2$
$(-7t^2+4)/4; \ -1/2 \leq t < 1/2$
$(5t^2-12t+7)/4; \ 1/2 \leq t < 1$
$(3t^2-8t+5)/4; \ 1 \leq t < 3/2$
$(-t^2+4t-4)/4; \ 3/2 \leq t \leq 2$

INDUSTRIAL APPLICABILITY

As described above, the present invention performs interpolation operation between a plurality of discrete data by using a sampling function that can be differentiated finite times and has values of a local support. Hence, since it is good enough to make only the discrete data included in this local support be an object of the interpolation operation, operation quantity is few, and no truncation error arises. Therefore, it is possible to obtain a precise interpolation result.

What is claimed is:

1. A data interpolating system, comprising a computer, wherein a value between a plurality of discrete data is interpolated by performing convolution operation to the plurality of discrete data such as sounds and images using a sampling function that can be differentiated finite times and has values of a local support.

2. The data interpolation system according to claim 1, wherein the sampling function is a function that can be differentiated only once over the whole region.

3. A data interpolation system, comprising a computer, wherein a value between a plurality of discrete data is interpolated by performing convolution operation to the plurality of discrete data such as sounds and images using a sampling function that can be differentiated finite times and has values of a local support, wherein, with letting a third order B spline function be F(t), the sampling function is defined as follows:

$$H(t)=-F(t+1/2)/4+F(t)-F(t-1/2)/4.$$

4. The data interpolation system according to claim 3, wherein the third order B spline function F (t) is expressed as follows:

$(4t^2+12t+9)/4; \ -3/2 \leq t < -1/2$
$-2t^2+3/2; \ -1/2 \leq t < 1/2$
$(4t^2-12t+9)/4; \ 1/2 \leq t < 3/2.$ 5. The data interpolation system according to claim 3, comprising:

discrete data extracting unit for extracting a plurality of discrete data that exist before and after of an interpolating position that becomes an object of interpolation operation;

sampling function operating unit for calculating a value of the sampling function H(t) for each of a plurality of discrete data extracted in this manner, with letting distance between the data interpolating position and discrete data be t; and convolution operating unit for obtaining a value of the data interpolating position by performing convolution operation through adding values of the sampling function that are calculated by the sampling function operating unit and correspond to the plurality of discrete data respectively.

6. A data interpolation system, comprising a computer, wherein a value between a plurality of discrete data is interpolated by performing convolution operation to the plurality of discrete data such as sounds and images using a sampling function that can be differentiated finite times and has values of a local support, wherein the sampling function is defined as follows:

$(-t^2-4t-4)/4; \ -2 \leq t < -3/2$ $(3t^2+8t+5)/4; \ -3/2 \leq t < -1$ $(5t^2+12t+7)/4; \ -1 \leq t < -1/2$ $(-7t^2+4)/4; \ -1/2 \leq t < 1/2$ $(5t^2-12t+7)/4; \ 1/2 \leq t < 1$ $(3t^2-8t+5)/4; \ 1 \leq t < 3/2$ $(-t^2+4t-4)/4; \ 3/2 \leq t \leq 2.$ 7. The data interpolation system according to claim 6, comprising:

discrete data extracting unit for extracting a plurality of discrete data that exists before and after of an interpolating position an interpolating position that becomes an object of interpolation operation;

sampling function operating unit for calculating the sampling function H(t) for each of a plurality of discrete data extracted by the discrete data extracting unit, with letting distance between the data interpolating position and each discrete data be t; and convolution operating unit for obtaining a value of the data interpolating position by performing convolution operation through adding values of the sampling function that are calculated by the sampling function operating unit and correspond to the plurality of discrete data respectively.

8. A data interpolation system, comprising:

a discrete data extracting unit for extracting a plurality of discrete data that exist before and after an interpolating position that becomes an object of interpolation operation;

sampling function operating unit for calculating a value of the sample function that can be differentiated finite times and has values of local support for each of a plurality of discrete data extracted in this manner, based on distance between the data interpolating position and discrete data; and convolution operating unit for obtaining a value of the data interpolating position by performing convolution operation through adding values of the sampling function that are calculated by the sampling function operating unit and correspond to the plurality of discrete data respectively.

* * * * *